US012005479B2

(12) United States Patent
Lindley

(10) Patent No.: US 12,005,479 B2
(45) Date of Patent: Jun. 11, 2024

(54) SORTING DEVICE AND METHOD

(71) Applicant: TGW Logistics Group GmbH, Marchtrenk (AT)

(72) Inventor: Timothy Lindley, Schwerte (DE)

(73) Assignee: TGW Logistics Group Gmbh, Marchtrenk (AT)

( * ) Notice: Subject to any disclaimer, the term of this patent is extended or adjusted under 35 U.S.C. 154(b) by 0 days.

(21) Appl. No.: 17/783,432

(22) PCT Filed: Nov. 11, 2020

(86) PCT No.: PCT/AT2020/060396
§ 371 (c)(1),
(2) Date: Jun. 8, 2022

(87) PCT Pub. No.: WO2021/127715
PCT Pub. Date: Jul. 1, 2021

(65) Prior Publication Data

US 2023/0020900 A1 Jan. 19, 2023

(30) Foreign Application Priority Data

Dec. 23, 2019 (AT) .............................. A 51156/2019

(51) Int. Cl.
*B07C 5/38* (2006.01)
*B07C 5/36* (2006.01)
*B65G 1/137* (2006.01)

(52) U.S. Cl.
CPC ................ *B07C 5/361* (2013.01); *B07C 5/38* (2013.01)

(58) Field of Classification Search
CPC .. B07C 5/361; B07C 5/38; B07C 5/00; B07C 5/36; B07C 5/34; B07C 3/06; B07C 3/08; B07C 3/065; B07C 3/082; B07C 3/087; B65G 1/137
USPC .......................................................... 209/552
See application file for complete search history.

(56) References Cited

U.S. PATENT DOCUMENTS 5,794,534 A * 8/1998 Enderlein ................. B07C 5/36 209/540
8,322,287 B2 * 12/2012 Oguro ............... H01L 21/67733 104/91
9,296,561 B2 3/2016 Wend et al.
10,538,395 B2 1/2020 Schneuing et al.
11,084,657 B2 8/2021 Herzog-Lang et al.
2010/0076593 A1 * 3/2010 Martin ...................... B07C 1/04 700/223
2020/0024074 A1 1/2020 Herzog-Lang et al.

FOREIGN PATENT DOCUMENTS

DE 201 03 664 U1 6/2001
DE 101 45 606 A1 4/2003
DE 10 2006 029 728 A1 1/2008
(Continued)

OTHER PUBLICATIONS

International Search Report in PCT/AT2020/060396, mailed Feb. 12, 2021.

*Primary Examiner* — Gene O Crawford
*Assistant Examiner* — Muhammad Awais
(74) *Attorney, Agent, or Firm* — Collard & Roe, P.C.

(57) ABSTRACT

In a sorting method and a sorting device, articles are sorted and identified in multiple stages and are discharged from the sorting lines in a manner backed up in multiple sorting lines.

12 Claims, 8 Drawing Sheets

(56) References Cited

FOREIGN PATENT DOCUMENTS

| | | | | | |
|---|---|---|---|---|---|
| DE | 20 2017 100 206 | U1 | | 4/2018 | |
| EP | 1 293 455 | B1 | | 6/2005 | |
| EP | 2 789 555 | A1 | | 10/2014 | |
| EP | 2789555 | | * | 10/2014 | |
| EP | 2789555 | A1 | * | 10/2014 | ........... B65G 1/0457 |
| EP | 3 437 745 | A1 | | 2/2019 | |
| EP | 3437745 | | * | 2/2019 | |
| EP | 3437745 | A1 | * | 2/2019 | ............... B07C 3/02 |
| WO | 0242012 | A1 | | 5/2002 | |
| WO | 2018/130712 | A2 | | 7/2018 | |

* cited by examiner

SORTING DEVICE AND METHOD

CROSS REFERENCE TO RELATED APPLICATIONS

This application is the National Stage of PCT/AT2020/060396 filed on Nov. 11, 2020, which claims priority under 35 U.S.C. § 119 of Austrian Application No. A 51156/2019 filed on Dec. 23, 2019, the disclosure of which is incorporated by reference. The inter-national application under PCT article 21(2) was not published in English.

BACKGROUND OF THE INVENTION

1. Field of the Invention

The invention relates to a sorting device and a sorting method.

2. Description of the Related Art

A generic sorting device and a related sorting method is disclosed in the application EP 3 437 745 A1. Here, either interrupters in the center of delay lines or scanning devices at the end of delay lines are used. However, this may cause large gaps between the articles to be sorted, which has a negative effect on the performance of the sorting system and/or the sorting method.

Furthermore, a method for storing articles is known from DE 101 45 606 A1, in which the articles are first conveyed into a first article storage. Before a branching, data of the articles is acquired. Based on the data, it is decided whether the articles are conveyed into a second article storage or whether it is output. However, in this case, the articles are not being sorted.

SUMMARY OF THE INVENTION

The object of the present invention is to overcome the shortcomings of the prior art and to provide a sorting device and a sorting method, by means of which a simple and efficient sorting of articles is possible.

This object is achieved by means of a sorting device and a sorting method according to the enclosed independent claims.

A sorting device according to one aspect of the present invention relates to an (automated) sorting device for sorting multiple articles, wherein the device comprises at least one first sorting stage with at least two first sorting lines. Each of them have a first entrance upstream and a first exit downstream, wherein the first entrances of the first sorting lines of the first sorting stage are connected to a supply path for supplying the articles. The first exits of the first sorting lines of the first sorting stage are connected to a first transport path for advancing/transporting the articles further, and at each of the first exits of the first sorting lines of the first sorting stage, a first stopper is arranged. Said stopper comprises a switching element, which can be actuated by a controller in order to discharge a group of articles form the respective first sorting line onto the first transport path. In the supply path, a first apparatus for separating and identifying is arranged upstream of the first sorting lines. In each case, a second apparatus for separating and identifying is arranged in the first sorting lines of the first sorting stage and upstream of the corresponding first stopper. The device further comprises at least one second sorting stage with at least two second sorting lines. Each of these have a second entrance upstream and a second exit downstream. In this regard, the first exits of the first sorting lines of the first sorting stage are connected to the second entrances of the second sorting lines of the second sorting stage by means of the first transport path, so that articles can be transferred from a (random one) of the first sorting lines of the first sorting stage into a (random one) of the second sorting lines of the second sorting stage. The second exits of the second sorting lines of the second sorting stage are connected to a second transport path for advancing/transporting the articles further.

At each of the second exits of the second sorting lines of the second sorting stage, a second stopper is arranged, which comprises a switching element, which can be actuated by a controller, in order to discharge a group of articles from the respective second sorting line onto the second transport path. In the first transport path, a third apparatus for separating and identifying is arranged.

In each case, a fourth apparatus for separating and identifying is arranged in the second sorting lines of the second sorting stage and upstream of the corresponding second stopper, wherein the apparatuses for separating and identifying are connected to the controller. This may have the advantage that gaps between the articles and/or groups of articles are kept as small as possible in all sorting stages and sorting lines and thus, the sorting performance is increased.

An (automated) sorting device according to a further aspect of the present invention further comprises a third sorting device, which is arranged downstream of the second sorting stage, and which comprises at least two third sorting lines, each of the third sorting lines having a third entrance upstream and a third entrance downstream. In this regard, the third entrances of the third sorting lines of the third sorting stage are connected to the second transport path, and the third exits of the third sorting lines of the third sorting stage are connected to a third transport path for advancing/transporting the articles further. At each of the third exits of the third sorting lines, a third stopper is arranged, which comprises a switching element, which can be actuated by a controller, in order to discharge a group of articles from the respective third sorting line onto the third transport path. In the second transport path, a fifth apparatus for separating and identifying is arranged. In this regard, a sixth apparatus for separating and identifying is arranged in the third sorting lines of the third sorting stage and upstream of the corresponding third stopper. The fifth and sixth apparatuses for separating and identifying are connected to the controller. This may have the advantage that the performance of the sorting device can be increased.

An (automated) sorting device according to a further aspect of the present invention further comprises a fourth sorting device, which is arranged downstream of the third sorting stage, and which comprises at least two fourth sorting lines, each of the fourth sorting lines having a fourth entrance upstream and fourth entrance downstream. In this regard, the fourth entrances of the fourth sorting lines of the fourth sorting stage are connected to the third transport path, and the fourth exits of the fourth sorting lines of the fourth stage are connected to a fourth transport path for advancing/transporting the articles further. At each of the fourth exits of the fourth sorting lines, a fourth stopper is arranged, which comprises a switching element, which can be actuated by a controller, in order to discharge a group of articles from the respective fourth sorting line onto the fourth transport path. In the third transport path, a seventh apparatus for separating and identifying is arranged. In each case, an eighth apparatus for separating and identifying is arranged in the fourth sorting lines of the fourth sorting stage and upstream of the corresponding fourth stopper, wherein the seventh and eighth apparatuses for separating and identifying are connected to the controller. This may have the advantage that the performance of the sorting device can be further increased.

In a sorting device according to a further aspect of the present invention, at least one of the respective sorting stages has more than two sorting lines. This may have the advantage that the performance of the sorting device can be developed.

In a sorting device according to a further aspect of the present invention, the controller is configured and provided for counting the articles by means of at least one of the apparatuses for separating and identifying. This may have the advantage that the transport movement of any article in the sorting device can be tracked, and this may also be used for a sorting method. In this regard, the articles are counted at the apparatus for separating and identifying, for example by means of transporting them past a contact, a light barrier, a proximity sensor, and the like. The apparatuses for separating and identifying therefore only determine the presence of an article and count it. Such a technical embodiment does not take much effort and works very reliably.

In a sorting device according to a further aspect of the present invention, the apparatuses for separating and identifying comprise at least one reader, and the articles are assigned an identifying means, which can be read by the reader. This may have the advantage that a plurality of pieces of information is assigned to an article and may possibly also be used for the controller of the sorting device or a sorting method. The identifying means is preferably designed as an RFID transponder, and the reader is an RFID reader. RFID (radio frequency identification) technology may prove particularly efficient for use in the sorting device according to the invention. A further possible identifying means may be a barcode arranged on the article, the barcode being readable by a barcode reader as the reader.

In a sorting device according to a further aspect of the present invention, the supply path, the sorting lines, and the transport path(s) comprise an overhead conveying device for the suspended transport of the articles. The overhead conveying device allows for a simple and gentle transport of articles and enables a particularly high-performance sorting with a compact design. Combined with the sorting device according to the invention, the sorting performances, which are high to begin with, can be further optimized.

In a sorting device according to a further aspect of the present invention, the overhead conveying device comprises at least one hanging bag for receiving one or multiple articles. Using hanging bags allows transporting articles of different types. For this purpose, the hanging bag (also referred to as transport bag) as it is described in WO 2018/130712 A2, for example, has a storage space bounded by flexible side walls, the volume of which storage space can be maximized or minimized and in which an article can be received.

In a sorting device according to a further aspect of the present invention, the overhead conveying device comprises transport carriers for hanging at least one article. Using such transport carriers allows transporting articles on hangers.

Generally, the overhead conveying device may also comprise at least one hanging bag for receiving one or multiple articles and at least one transport carrier for hanging one or multiple articles.

According to a further aspect of the present invention, an (automatic) sorting method for sorting of articles comprises the steps of:

- supplying articles on a supply path,
- a first identification and separation of the articles in the supply path (in particular with a first apparatus for separating and identifying),
- a first distribution of the articles based on the first identification and separation on at least two first sorting lines,
- a second identification and separation of the articles in the respective first sorting line (in particular with a second apparatus for separating and identifying),
- a first collecting of articles to form a group of articles in the respective first sorting line (in particular at a first stopper in the first sorting line, which is arranged downstream of the second apparatus for separating and identifying),
- a first discharge of the group of articles into a first transport path,
- a third identification and separation of the articles in the first transport path (in particular with a third apparatus for separating and identifying),
- a second distribution of the articles based on the third identification and separation on at least two second sorting lines,
- a fourth identification and separation of the articles in the respective second sorting line (in particular with a fourth apparatus for separating and identifying),
- a second collecting of articles to form a group of articles in the respective second sorting line (in particular at a second stopper in the second sorting line, which is arranged downstream of the fourth apparatus for separating and identifying),
- a second discharge of the group of articles into a first transport path.

The first collecting of articles to form a group in the respective first sorting line may comprise collecting articles to form a group in a number and/or type of article predetermined by a controller.

Preferably, the group of articles is formed in the respective first sorting line between the first stopper in the first sorting line and the second apparatus for separating and identifying. Such a group of articles may also be referred to as a "sorting run".

Preferably, the second apparatus for separating and identifying is arranged between the entrance and exit of a first sorting line so that, during the first collecting of the articles to form a group, articles can be further supplied into the sorting line at the respective first stopper of the first sorting line upstream of the second apparatus for separating and identifying.

Preferably, the first sorting stage comprises multiple first sorting lines, and in each case, groups of articles (sorting runs) can be formed in the first sorting lines at the first stopper, which groups of articles are subsequently discharged into the first transport path by means of the first stopper. By means of the first stoppers in the first sorting lines, the discharge of the groups of articles (sorting runs) into the first transport path can also be controlled, so that the gaps between the groups of articles (sorting runs) can also be minimized on the first transport path.

The second collecting of articles to form a group in the respective second sorting line may comprise collecting articles to form a group in a number and/or type of article predetermined by a controller.

Preferably, the group is formed in the respective second sorting line between the second stopper in the second sorting line and the fourth apparatus for separating and identifying. Such a group of articles may also be referred to as a "sorting run".

Preferably, the fourth apparatus for separating and identifying is arranged between the entrance and exit of a fourth sorting line so that, during the second collecting of the articles to form a group, articles can be further supplied at the second stopper of the respective second sorting line upstream of the fourth apparatus for separating and identifying.

Preferably, the second sorting stage comprises multiple second sorting lines, and in each case, groups of articles (sorting runs) can be formed in the second sorting lines at the second stopper, which groups of articles are subsequently discharged into the second transport path by means of the respective second stopper. By means of the second stoppers in the second sorting lines, the discharge of the groups of articles (sorting runs) into the second transport path can also be controlled, so that the gaps between the groups of articles (sorting runs) can also be minimized on the second transport path.

The sorting method for automatically sorting articles, in particular hanging articles, may be carried out using the sorting device described above, for example.

This may have the advantage that the gaps between the articles are minimized and thus, a maximum sorting performance is achieved on short transport paths.

According to a further aspect of the present invention, a sorting method of furthermore comprises the steps of:

a fifth identification and separation of the articles in the second transport path (in particular with a fifth apparatus for separating and identifying), a third distribution of the articles based on the fifth identification and separation on at least two third sorting lines, a sixth identification and separation of the articles in the respective third sorting line (in particular with a sixth apparatus for separating and identifying), a third collecting of articles to form a group of articles in the respective third sorting line (in particular at a third stopper in the third sorting line, which is arranged downstream of the third apparatus for separating and identifying, a third discharge of the group of articles into a third transport path.

The third collecting of articles to form a group in the respective third sorting line may comprise collecting articles to form a group in a number and/or type of article predetermined by a controller.

Preferably, the group of articles is formed in the respective third sorting line between the third stopper in the third sorting line and the sixth apparatus for separating and identifying. Such a group of articles may also be referred to as a "sorting run".

Preferably, the sixth apparatus for separating and identifying is arranged between the entrance and exit of a third sorting line so that, during the third collecting of the articles to form a group, articles can be further supplied at the respective third stopper upstream of the sixth apparatus for separating and identifying.

Preferably, the third sorting stage comprises multiple third sorting lines, and in each case, groups of articles (sorting runs) can be formed in the third sorting lines, which groups of articles are subsequently discharged into the third transport path by means of the respective third stopper. By means of the third stoppers in the third sorting lines, the discharge of the groups of articles (sorting runs) into the third transport path can also be controlled, so that the gaps between the groups of articles (sorting runs) can also be minimized on the third transport path.

According to a further aspect of the present invention, a sorting method furthermore comprises the steps of:

a seventh identification and separation of the articles in the third transport path (in particular with a seventh apparatus for separating and identifying), a third distribution of the articles based on the seventh identification and separation on at least two fourth sorting lines, an eighth identification and separation of the articles in the respective fourth sorting line (in particular with an eighth apparatus for separating and identifying), a fourth collecting of articles to form a group of articles in the respective fourth sorting line, a fourth discharge of the group of articles into a fourth transport path.

The fourth collecting of articles to form a group in the respective fourth sorting line may comprise collecting articles to form a group in a number and/or type of article predetermined by a controller.

Preferably, the group of articles is formed in the respective fourth sorting line between the fourth stopper in the fourth sorting line and the eighth apparatus for separating and identifying. Such a group of articles may also be referred to as a "sorting run".

Preferably, the eighth apparatus for separating and identifying is arranged between the entrance and exit of fourth sorting line so that, during the fourth collecting of the articles to form a group, articles can be further supplied at the fourth stopper upstream of the eighth apparatus for separating and identifying.

Preferably, the fourth sorting stage comprises multiple fourth sorting lines, and in each case, groups of articles (sorting runs) can be formed in the fourth sorting lines, which groups of articles are subsequently discharged into the fourth transport path by means of the respective fourth stopper. By means of the fourth stoppers in the fourth sorting lines, the discharge of the groups of articles (sorting runs) into the fourth transport path can also be controlled, so that the gaps between the groups of articles (sorting runs) can also be minimized on the fourth transport path.

A switching element may be an actuator, which is actuated electrically, pneumatically, hydraulically (or any combination thereof), for example a Piezo valve, pneumatic valve, a hydraulic valve, and the like.

A controller within the meaning of this application may comprise all forms of controllers known in the prior art, in particular a PLC (programmable logic controller) or a material flow controller.

Generally, a "hanging article" is understood to mean an article, which is transported suspended on a transport carrier, for example, by means of a hanger. Classic examples of hanging articles are articles of clothing suspended on clothes hangers, or transport bags for receiving articles.

The apparatus for separating and identifying may be designed as a combined apparatus or comprise one apparatus for separating and one apparatus for identifying. In the case of separate apparatuses being used, they may cooperate and be connected by means of a connecting line. The arrangement of a combined apparatus or separate apparatuses may be selected freely and e.g. location-dependent in the sorting device. The apparatus for identifying and separating can stop (detain) articles in the transport movement when a transport section downstream in the sorting line has not yet been released by the controller, for example a group of articles has not yet been released by the stopper and/or has not been discharged onto a downstream section of the sorting device.

During identifying, information from an identifying means can be read by a reader and be processed by the controller, as described above.

Identifying may also be counting of the articles. For clearly identifying an individual article, the article is detected and subsequently, the articles passing through the sorting device are merely counted. Thus, the controller can assign the position and/or the section in the sorting device to a specific article at any time, and the sorting process and/or the sorting device can be controlled accordingly.

The respective stopper at the exit of a sorting line may be arranged in the region of a transport connection, for example a switch, to the respective transport path. For the function of the device, merely an arrangement in the region of the respective exit of the sorting line is necessary. Each stopper is connected to the controller.

The above features of the sorting device may be applied to the sorting method and vice versa.

BRIEF DESCRIPTION OF THE DRAWINGS

For the purpose of better understanding of the invention, it will be elucidated in more detail by means of the figures below.

These show in a respectively very simplified schematic representation.

DETAILED DESCRIPTION OF PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

It should be noted that in the figures, the flow of the articles proceeds from the top to the bottom. Also, for the sake of clarity, only a few articles and/or groups of articles are shown.

Figure 1:
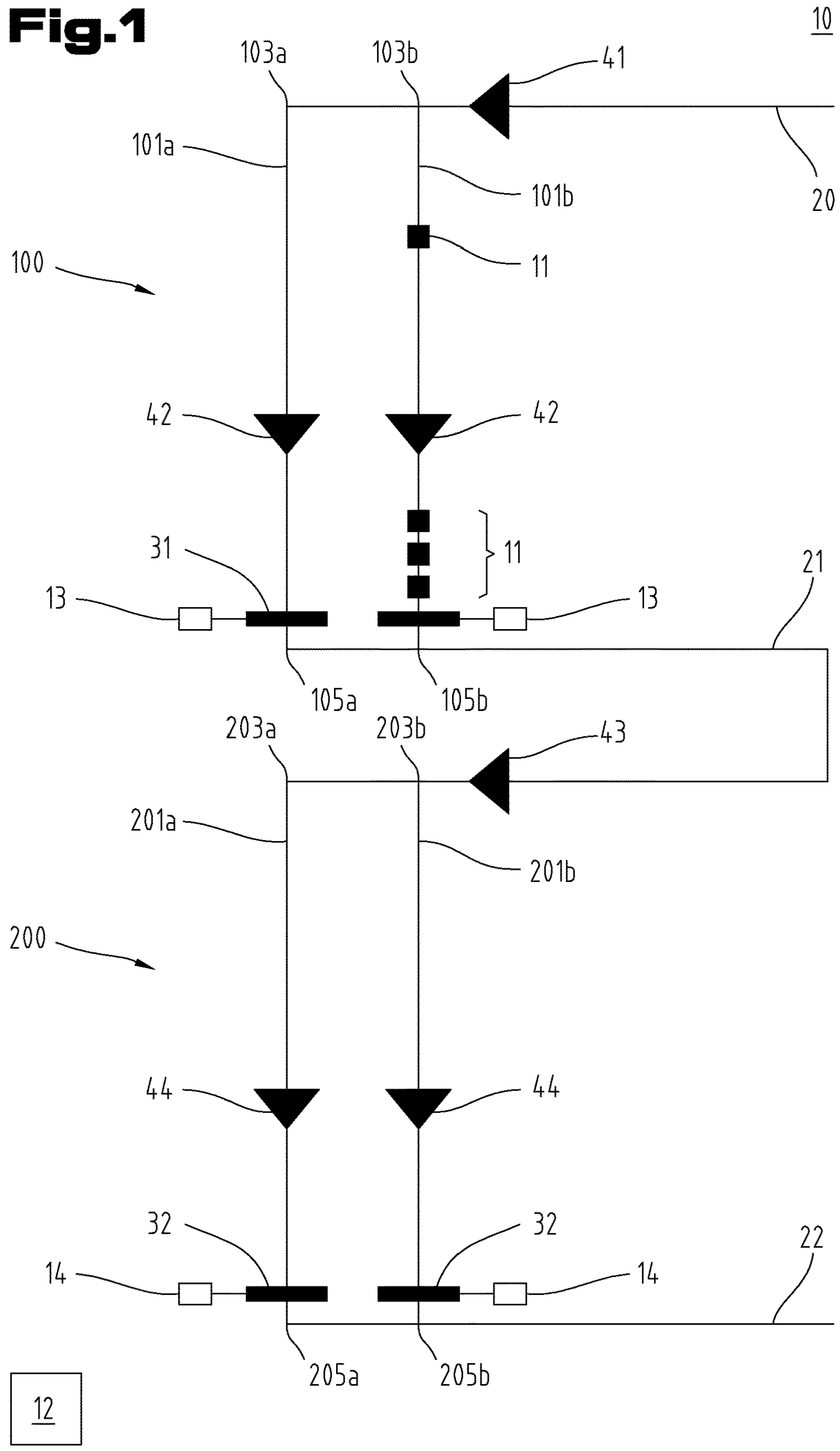
FIG. 1 a sorting device according to the invention according to a first embodiment.

With initial reference, FIG. 1 shows a first schematic embodiment of a sorting device 10 according to the invention. The sorting device 10 comprises a controller 12, a first sorting stage 100, a second sorting stage 200, a supply path 20, a first transport path 21, and a second transport path 22. The first sorting stage 100 comprises two first sorting lines 101*a* and 101*b*. The second sorting stage 200 comprises two second sorting lines 201*a* and 201*b*. The first sorting lines 101*a* and 101*b* each comprise first entrances 103*a* and 103*b* as well as first exits 105*a* and 105*b*. The first entrances 103*a* and 103*b* are connected to the supply path 20. The supply path 20 further comprises a first apparatus for separating and identifying 41 upstream of the first entrances 103*a* and 103*b*. The first exits 105*a* and 105*b* are connected to the first transport path 21.

In each of the first sorting lines 101*a* and 101*b*, one second apparatus for separating and identifying 42 is arranged upstream of the respective first exit 105*a* and/or 105*b*. A third apparatus for separating and identifying 43 is arranged in the first transport path 21 downstream of the first exits 105*a* and 105*b* and upstream of the second entrances 203*a* and 203*b*.

In each case, one stopper 31 is arranged between the respective first exit 105*a* and/or 105*b* and the respective second apparatus for separating and identifying 42. The sorting device 10 thus also comprises the stoppers 31. All stoppers 31 are provided to release and/or discharge a group of articles 11 from the respective sorting line onto the transport path arranged downstream. In FIG. 1, a group of three articles 11 is arranged upstream of the stopper 31 in the first sorting line 101*b* and is held by the stopper 31. Once the stopper 31 is opened by the controller 12, the group of articles 11 accumulated by the stopper 31 reach the respective transport path 21 arranged downstream. Preferably, a next article 11 is additionally transported along the first sorting line 101*b* upstream of the second apparatus for separating and identifying 42.

Thus, the sorting device 10 for sorting multiple articles 11 may comprise:

- a supply path 20 for supplying the articles 11,
- at least one first sorting stage 100 with at least two first sorting lines 101*a*, 101*b*, each having a first entrance 103*a*, 103*b* upstream and a first exit 105*a*, 105*b* downstream,
- at least one first transport path 21 for advancing the articles 11,
- a first stopper 31 on each of the first exits 105*a*, 105*b* of the first sorting lines 101*a*, 101*b* of the first sorting stage 100,
- a first apparatus for separating and identifying 41 in the supply path 20 upstream of the first sorting lines 101*a*, 101*b*, and/or
- in each case, a second apparatus for separating and identifying 42 in the first sorting lines 101*a*, 101*b* of the first sorting stage 100 and upstream of the corresponding first stopper 31.

The first entrances 103*a*, 103*b* of the first sorting line 101*a*, 101*b* of the first sorting stage 100 are connected to the supply path 20 for supplying the articles 11, and the first exits 105*a*, 105*b* of the first sorting line 101*a*, 101*a* of the first sorting stage 100 are connected to the first transport path 21 for advancing the articles 11.

The second sorting lines 201*a* and 201*b* of the second sorting stages 200 are connected with their respective second entrances 203*a* and 203*b* with the first transport path 21, downstream of the third apparatus for separating and identifying 43. The structure of the second sorting lines 201*a* and

201*b* correspond to that of the first sorting lines 101*a* and 101*b*, wherein a fourth apparatus for separating and identifying 44 is arrange din each of the second sorting lines 201*a* and 201*b*, upstream of the respective second exit 205*a* and/or 205*b*. A detailed description is not given at this point for the sake of brevity. The exits 205*a* and 205*b* of the second sorting lines 201*a* and 201*b* are connected to the second transport path 22.

In each case, one stopper 32 is arranged between the respective second exit 205*a* and/or 205*b* and the respective fourth apparatus for separating and identifying 44. The sorting device 10 thus also comprises the stoppers 32. All stoppers 32, analogously to the stoppers 31 of the first sorting stage 100, are provided to release and/or discharge a group of articles 11 from the respective sorting line onto the transport path arranged downstream. Once the stopper 32 is opened by the controller 12, the group of articles 11 accumulated by the stopper 32 reach the respective transport path 22 arranged downstream.

Thus, the sorting device 10 for sorting multiple articles 11 may comprise:

- a third apparatus for separating and identifying 43 in the first transport path 21,
- at least one second sorting stage 200 with at least two second sorting lines 201*a*, 201*b*, each having a first entrance 203*a*, 203*b* upstream and a second exit 205*a*, 205*b* downstream,
- a second stopper 32 on each of the second exits 205*a*, 205*b* of the second sorting lines 201*a*, 201*b* of the second sorting stage 200,
- in each case, a fourth apparatus for separating and identifying 44 in the second sorting lines 201*a*, 201*b* of the second sorting stage 200 and upstream of the corresponding second stopper 32, and/or
- at least one second transport path 22 for advancing the articles 11.

The first exits 105*a*, 105*b* of the first sorting lines 101*a*, 101*b* of the first sorting stage 100 are connected to the second entrances 203*a*, 203*b* of the second sorting lines 201*a*, 201*b* of the second sorting stage 200 by means of the first transport path 21, so that articles 11 from one of the first sorting lines 101*a*, 101*b* of the first sorting stage 100 can be conveyed into one of the second sorting lines 201*a*, 201*b* of the second sorting stage 200. The second exits 205*a*, 205*b* of the second sorting lines 201*a*, 201*b* of the second sorting stage 200 are connected to the second transport path 22 for advancing the articles 11.

Thus, the sorting device 10 for sorting multiple articles 11 may comprise:

- the controller 12, on the one hand for actuating a switching element 13 for the respective first stopper 31, in order to discharge a group of articles 11 from the respective first sorting line 101*a*, 101*b* onto the first transport path 21, and on the other hand for actuating a switching element 14 for the respective second stopper 32, in order to discharge a group of articles 11 from the respective second sorting line 201*a*, 201*b* onto the second transport path 22. The apparatuses for separating and identifying 41 . . . 44 are connected to the controller 12.

Figure 7:
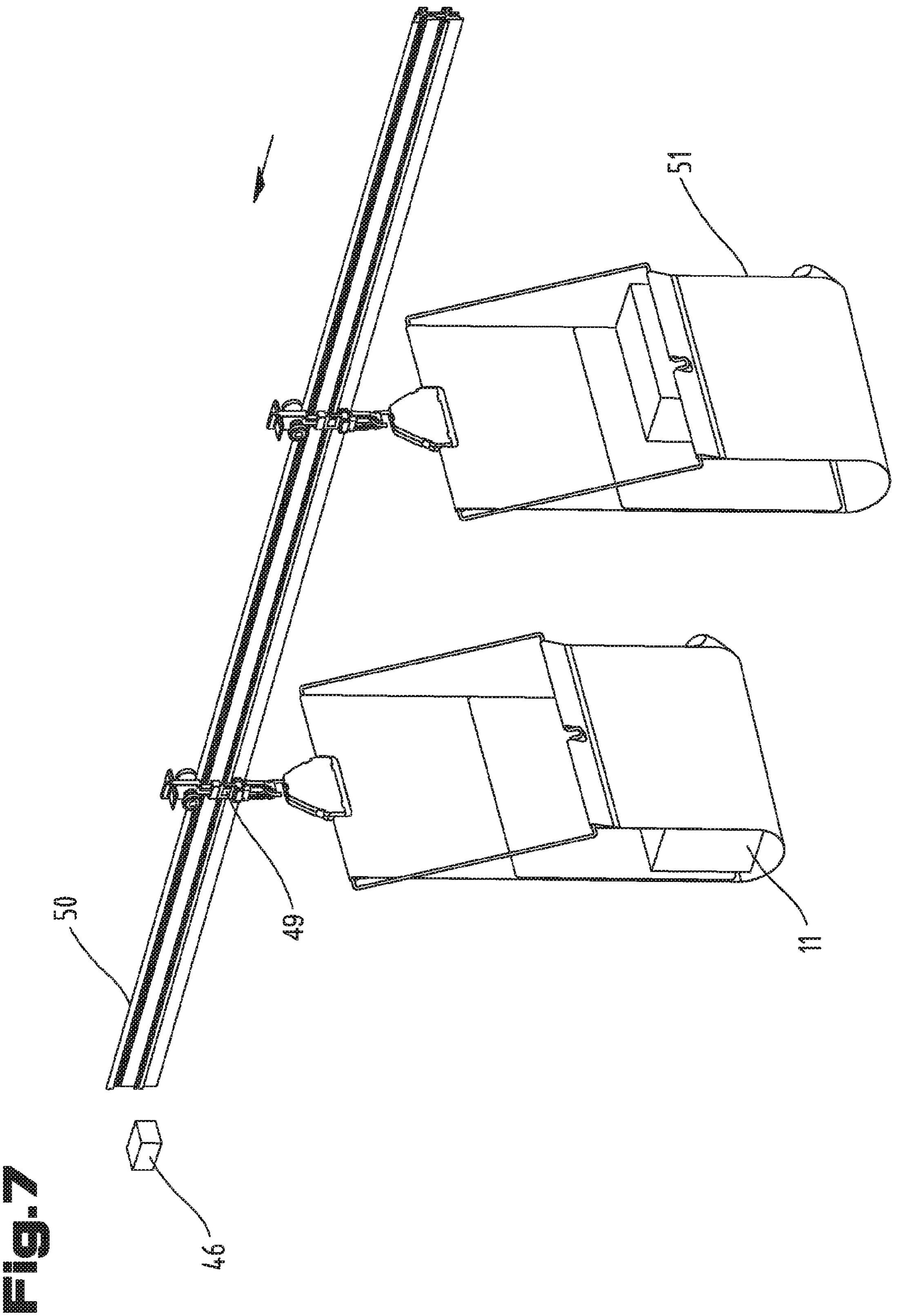
FIG. 7 an exemplary embodiment of an overhead conveying device for the different transport sections (supply path, sorting lines, and transport path(s)) of the sorting device and with hanging bags for receiving articles, in a very simplified representation.

All apparatuses for separating and identifying 41 . . . 44 can separate, count articles 11 and/or read information from an identifying means 49 assigned to the respective articles 11 (as can be seen in FIG. 7, for example).

Figure 2:
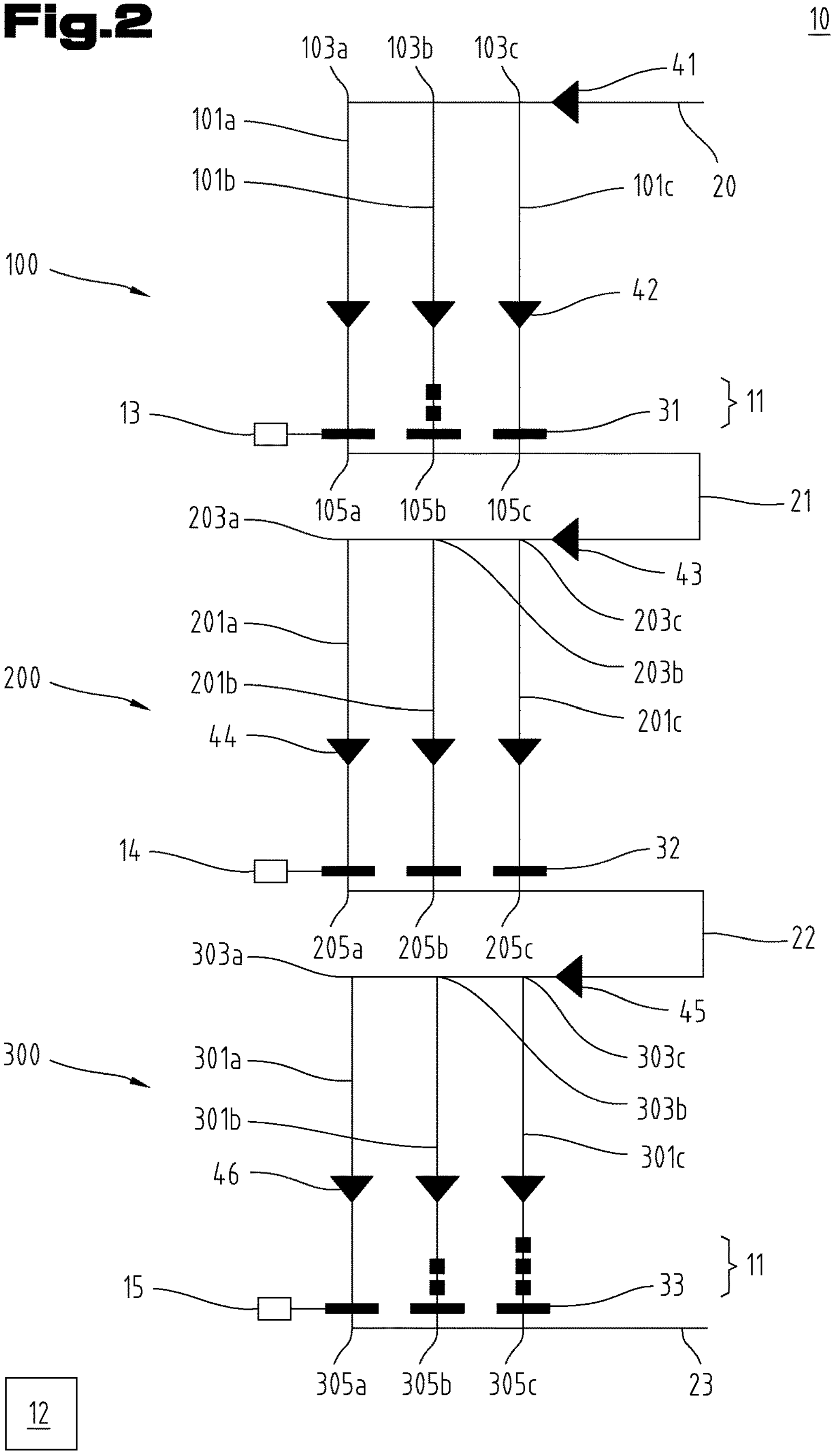
FIG. 2 a sorting device according to the invention according to a second embodiment.

FIG. 2 shows a further and possibly independent embodiment of the sorting device 10, wherein again, equal reference numbers/component designations are used for equal parts as before in FIG. 1. In order to avoid unnecessary repetitions, it is pointed to/reference is made to the detailed description in FIG. 1 preceding it.

The sorting device 10 shown in FIG. 2 is different from the sorting device 10 shown in FIG. 1 due to a third sorting stage 300 with three third sorting lines 301*a* to 301*c* and, in each case, a further first sorting line 101*c* and second sorting line 201*c*. The structure within the respective sorting stages 100, 200, 300 corresponds to the structure known from FIG. 1. As can be seen from a combination of FIGS. 1 and 2, the third sorting stage 300 is arranged downstream of the second exits 205*a* to 205*c* of the second sorting stage 200. The second transport path 22 has a fifth apparatus for separating and identifying 45 between the second exits 205*a* to 205*c* and the third entrances 303*a* to 303*c*. A third transport path 23 is arranged downstream of the third exits 305*a* to 305*c*. Furthermore, in each of the third sorting lines 301*a*, 301*b* and 301*c*, one sixth apparatus for separating and identifying 46 is arranged upstream of the respective third exit 305*a* and/or 305*b*. In each case, one stopper 33 is arranged between the respective third exit 305*a*, 305*b*, 305*c* and the respective sixth apparatus for separating and identifying 46. All stoppers 33, analogously to the stoppers 31 and 32 of the first and second sorting stage 100 and 200, are provided to release and/or discharge a group of articles 11 from the respective sorting line onto the transport path arranged downstream. Once the stopper 33 is opened by the controller 12, the group of articles 11 accumulated by the stopper 33 reach the respective transport path 23 arranged downstream. Groups of articles 11 are shown by way of example in the region of the stopper 31 in the sorting line 101*b* and/or in the region of the stoppers 33 in the sorting lines 301*b* and 301*c*.

Thus, the sorting device 10 for sorting multiple articles 11 may comprise:

- a fifth apparatus for separating and identifying 45 in the second transport path 22,
- at least one third sorting stage 300 with at least two third sorting lines 301*a*, 301*b*, each having a third entrance 303*a*, 303*b* upstream and a third exit 305*a*, 305*b* downstream,
- a third stopper 33 on each of the third exits 305*a*, 305*b* of the third sorting lines 301*a*, 301*b* of the third sorting stage 300,
- in each case, a sixth apparatus for separating and identifying 46 in the third sorting lines 301*a*, 301*b* of the third sorting stage 300 and upstream of the corresponding second stopper 33, and/or
- at least one third transport path 23 for advancing the articles 11.

The fifth and sixth apparatuses for separating and identifying 45, 46 are connected to the controller 12.

Thus, the sorting device 10 for sorting multiple articles 11 may comprise:

- the controller 12, on the one hand for actuating a switching element 15 for the respective third stopper 33 in order to discharge a group of articles 11 from the respective third sorting line 301*a*, 301*b* onto the third transport path 23.

It should be noted that, for the sake of clarity, in FIG. 2 the respective switching element 13 for the respective first stopper 31 and the respective switching element 14 for the respective second stopper 32 and the respective switching element 15 for the respective third stopper 33 is only shown in context with the respective sorting lines 101*a*, 102*a*, 301*a*. It is understood that each of the first, second and third stoppers 31, 32, 33 comprises one switching element 13, 14, 15.

Figure 3:
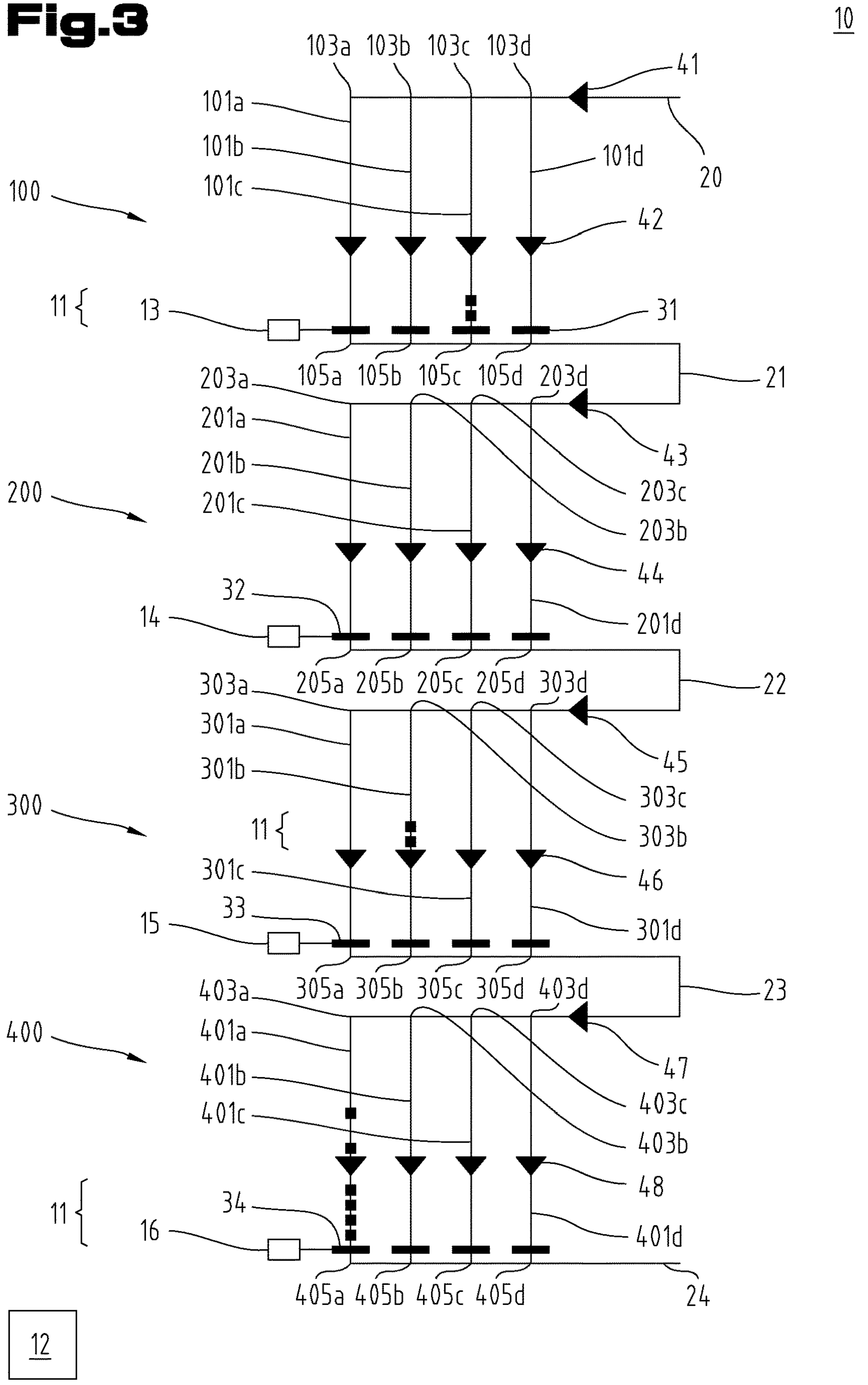
FIG. 3 a sorting device according to the invention according to a third embodiment.

In FIG. 3, a further and possibly independent embodiment of the sorting device 10 is shown, wherein again equal reference numbers and/or component designations are used for equal parts as in the preceding FIGS. 1 and 2. In order to avoid unnecessary repetitions, it is pointed to/reference is made to the detailed description in FIGS. 1 and 2 preceding it.

The sorting device 10 shown in FIG. 3 is different from the sorting device 10 shown in FIGS. 1 and 2 due to a fourth sorting stage 400 with four fourth sorting lines 401*a* to 401*d* and, in each case, a further first sorting line 101*d*, second sorting line 201*d*, third sorting line 301*d*. The structure within the respective sorting stages 100, 200, 300, 400 corresponds to the structure known from FIGS. 1 and 2. As can be seen from a combination of FIGS. 1, 2 and 3, the fourth sorting stage 400 is arranged downstream of the third exits 305*a* to 305*d* of the third sorting stage 300. The third transport path 23 has a seventh apparatus for separating and identifying 47 between the third exits 305*a* to 305*d* and the third entrances 403*a* to 403*d*. A fourth transport path 24 is arranged downstream of the fourth exits 405*a* to 405*d*. Furthermore, in each of the fourth sorting lines 401*a*, to 401*d*, one eighth apparatus for separating and identifying 48 is arranged upstream of the respective fourth exit 405*a* and/or 405*d*. In each case, one stopper 34 is arranged between the respective fourth exit 405*a* to 405*d* and the respective eighth apparatus for separating and identifying 48. All stoppers 34, analogously to the stoppers 31, 32 and 33 of the first, second and third sorting stage 100, 200 and 300, are provided to release and/or discharge a group of articles 11 from the respective sorting line onto the transport path arranged downstream. Once the stopper 34 is opened by the controller 12, the group of articles 11 accumulated by the stopper 34 reach the respective transport path 24 arranged downstream. A group of articles 11 is shown by way of example in the region of the stopper 31 in the sorting line 101*c*. At the sorting line 301*b* and at the sorting line 401*a*, articles 11 are shown in the direction towards the apparatuses for separating and identifying 46, 48.

Thus, the sorting device 10 for sorting multiple articles 11 may comprise:

- a seventh apparatus for separating and identifying 47 in the third transport path 23,
- at least one fourth sorting stage 400 with at least two fourth sorting lines 401*a*, 401*b*, each having a fourth entrance 403*a*, 403*b* upstream and a fourth exit 405*a*, 405*b* downstream,
- a fourth stopper 34 on each of the fourth exits 405*a*, 405*b* of the fourth sorting lines 401*a*, 401*b* of the fourth sorting stage 400,
- in each case, an eighth apparatus for separating and identifying 48 in the fourth sorting lines 401*a*, 401*b* of the fourth sorting stage 400 and upstream of the corresponding fourth stopper 34, and/or
- at least one fourth transport path 24 for advancing the articles 11.

The seventh and eighth apparatuses for separating and identifying 47, 48 are connected to the controller 12.

Thus, the sorting device 10 for sorting multiple articles 11 may comprise:

- the controller 12, on the one hand for actuating a switching element 16 for the respective fourth stopper 34 in order to discharge a group of articles 11 from the respective fourth sorting line 401*a*, 401*b* onto the fourth transport path 24.

It should be noted that, for the sake of clarity, in FIG. 3 the respective switching element 13 for the respective first stopper 31 and the respective switching element 14 for the respective second stopper 32 and the respective switching element 15 for the respective third stopper 33 and the respective switching element 16 for the respective fourth stopper 34 is only shown in context with the respective sorting lines 101*a*, 102*a*, 301*a*, 401*a*. It is understood that each of the first, second, third and fourth stoppers 31, 32, 33, 34 comprises one switching element 13, 14, 15, 16.

In the embodiments described above, all entrances and exits of the sorting lines are connected to the corresponding transport path and/or supply path by means of switches. The switches, stoppers, and apparatus for separating and identifying are connected to the controller 12 and are controlled by the controller 12. The transport movement of the articles in the sorting device can take place by means of gravity or in a driven manner (or a combination thereof). By means of a respective controlling of the switches in the region of the respective entrances of the sorting lines, the articles can be conveyed from the supply path and/or transport path to the sorting lines. The number of sorting lines per sorting stage is random and the sorting stages may have a number of sorting lines that is different from the other sorting stage(s).

Figure 4:
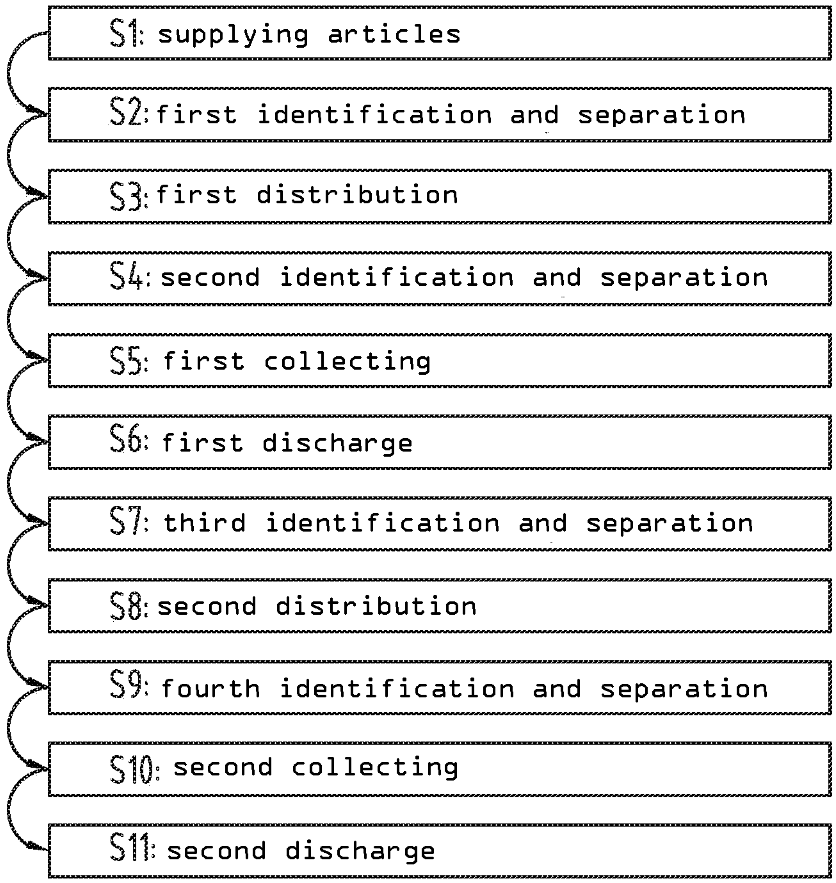
FIG. 4 a sequence of a sorting method according to the invention in a first embodiment.

FIG. 4 shows an embodiment of a sorting method according to the invention. In this process, articles 11 are supplied, in step s1, to a sorting device 10 (which may be one of the above sorting devices) by means of a supply path 20. In step S2, the articles 11 supplied in step S1 are identified and separated for the first time. This means that a distance between two individually identified articles 11 is provided, which allows for the articles 11 to be brought to a desired further course by means of switches located downstream. In the present case, this is achieved by means of, for example, switches, which guide the respective article on a sorting line.

Due to first identification and separation completed in step S2, it is possible in step S3 to distribute the corresponding article 11, as described above, to a first sorting line 101*a* to 101*d*. In a fourth step S4, the articles 11 distributed to the respective first sorting lines in step S3 are identified and separated a second time. The articles 11 identified and separated in step S4 in one of the first sorting lines 101*a* to 101*d* are then collected downstream by a stopper in the respective first sorting line 101*a* to 101*d* in step S5 until a group of articles 11 is complete. The group of articles 11 may comprise a number and/or type of articles 11 predetermined by the controller.

In step S6, the group of articles collected in step S5 is then discharged from one of the first stoppers 31 to a section located downstream. In step S7, the articles discharged in step S6 are identified and separated a third time. Due to the identification and separation completed in step S7, each of the articles 11 can be distributed a second time to second sorting lines 201*a* to 201*d* in step S8. In a step S9, the articles 11 distributed to the respective second sorting lines in step S8 are identified and separated a fourth time. The articles 11 identified and separated in step S9 in one of the second sorting lines 201*a* to 201*d* are then collected downstream by a stopper in the respective second sorting line 201*a* to 201*d* in step S10, until a group of articles 11 is complete. The group of articles 11 may comprise a number and/or type of articles 11 predetermined by the controller. In step S11, the group of articles 11 collected in step S10 is then discharged from one of the second stoppers 32 to a section located downstream.

Figure 5:
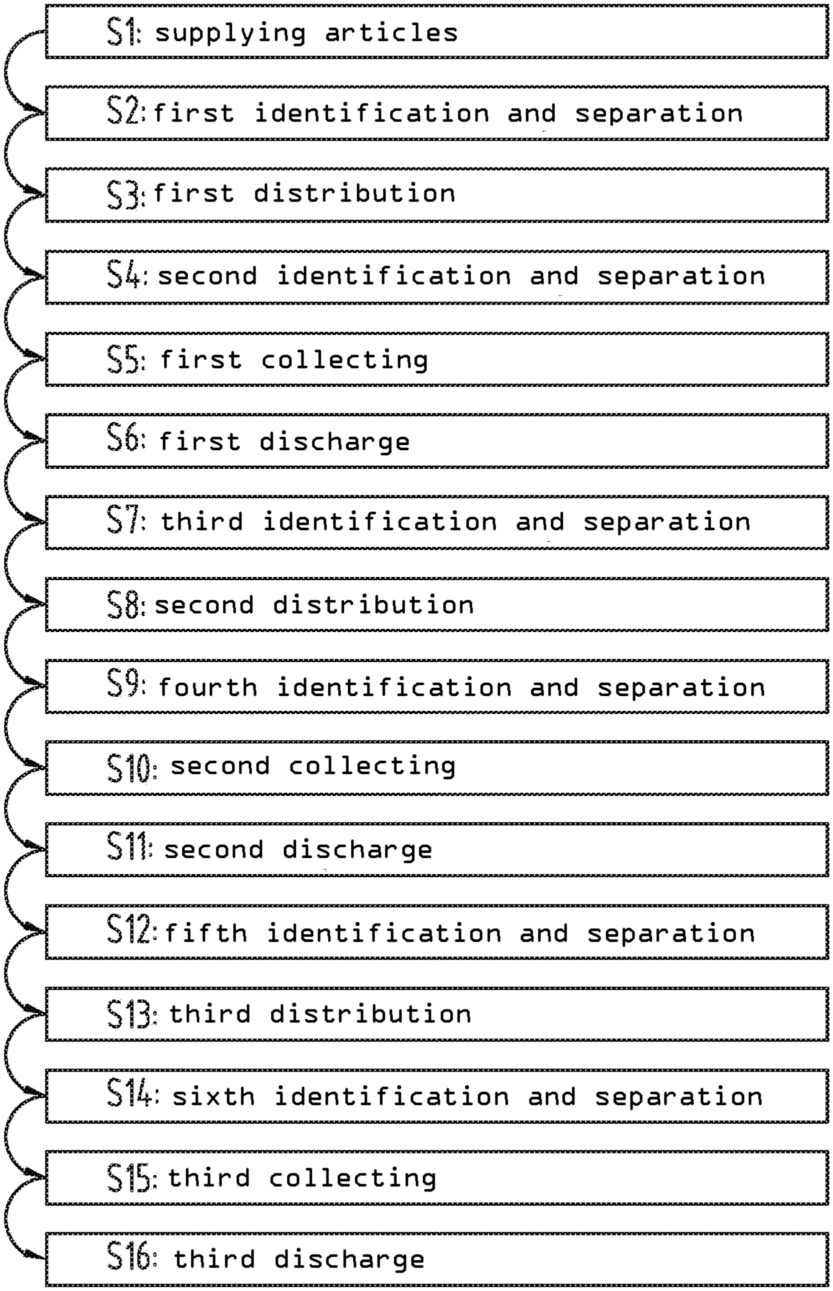
FIG. 5 a sequence of a sorting method according to the invention in a second embodiment.

The method shown in FIG. 5 corresponds with the method from FIG. 4, with the mere difference that a further and thus third collection of the articles on one of the third sorting lines 301*a* to 301*d* is comprised according to the method described in the context of FIG. 4.

The sequences of steps S12 to S16 correspond with the sequences of steps S7 to S11 described above.

Figure 6:
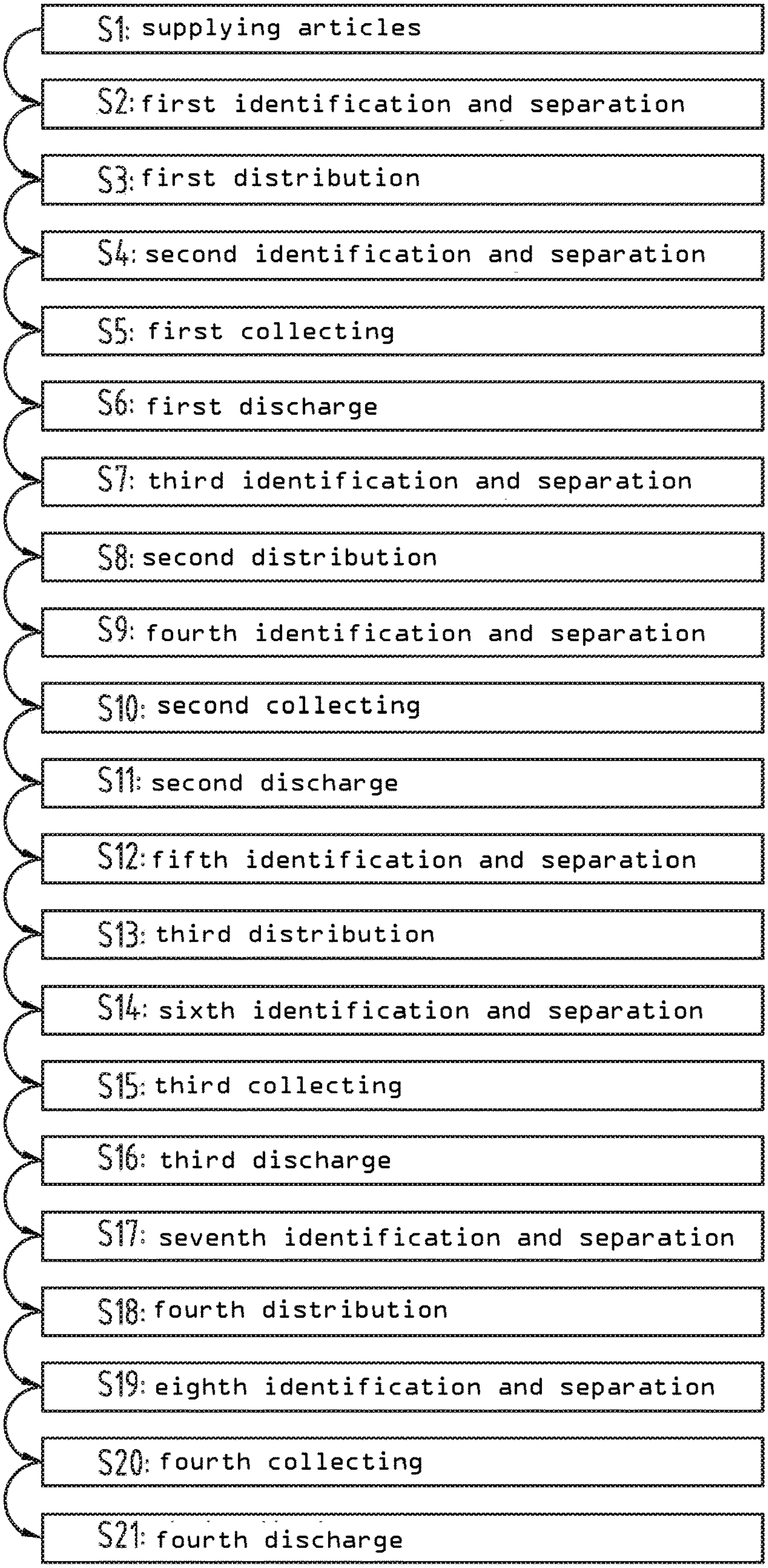
FIG. 6 a sequence of a sorting method according to the invention in a third embodiment.

The method shown in FIG. 6 corresponds with the method from FIG. 5, with the mere difference that a further and thus fourth collection of the articles on one of the fourth sorting lines 401*a* to 401*d* is comprised according to the method described in the context of FIG. 5. The sequences of steps S17 to S21 correspond with the sequences of steps S7 to S11 described above.

The groups of articles 11 mentioned above are determined by a controller and the formation of groups can be determined arbitrarily. The controller also controls the stoppers 31 to 34 and apparatuses for separating and identifying 41 to 48 as well as the switches dependent on a freely selectable program. If a certain group of articles 11 reaches one of the stoppers 31 to 34, the respective apparatus for separating and identifying 41 to 48 upstream holds back the articles 11 located upstream until the relevant group of articles 11 was released by the respective stopper 31 to 34 and directed into a section downstream of the respective stopper 31 to 34. Then, by means of the interaction in each sorting line 101*a* to 101*d*, 201*a* to 201*d*, 301*a* to 301*d*, 401*a* to 401*d* between the stopper 31 to 34 and the upstream apparatus for separating and identifying 42, 44, 46 and 48, the next group of articles 11 is collected in front of the respective stopper 31 to 34.

At this point, it should be noted that all apparatuses for separating and identifying 41 to 48 separate, count the articles 11 and/or can read information from an identifying means 49 assigned to the respective articles 11. FIG. 7 shows by way of example an identifying means 49 and one of the apparatuses for separating and identifying, namely the apparatus for separating and identifying 46. The apparatus for separating and identifying 46 comprises at least one reader, by means of which data can be read from the identifying means 49.

FIG. 7 shows an example of an overhead conveying device 50 comprising hanging bags 51, each of which forming a storage space bounded by flexible side walls, into which storage space one article 11 is placed in each case.

Figure 8:
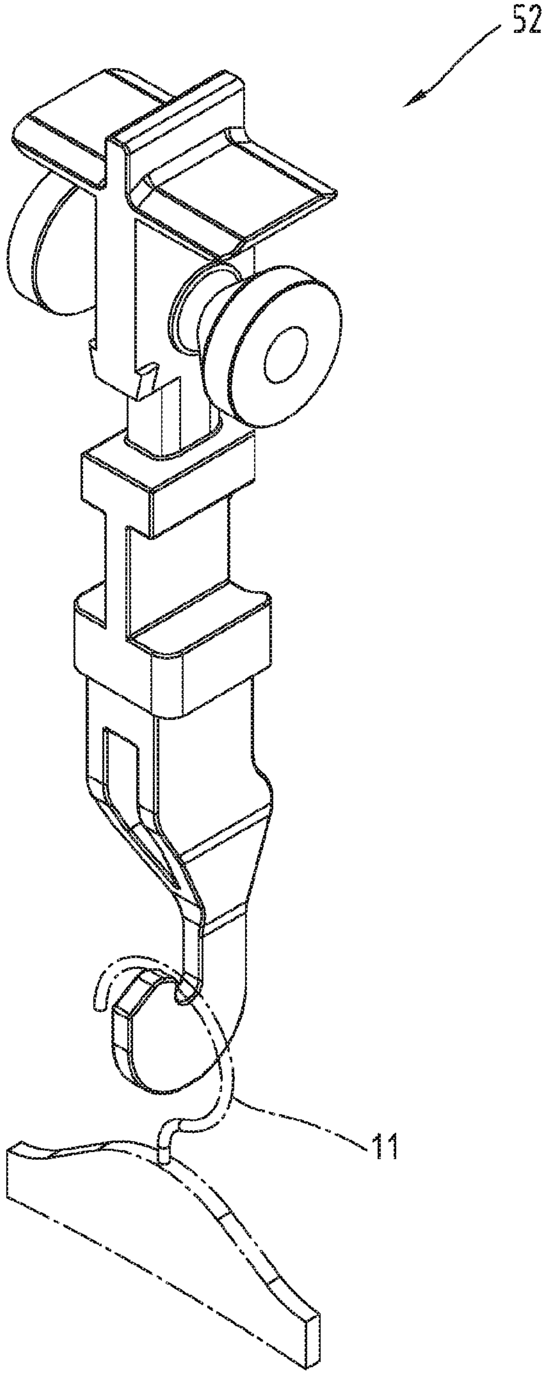
FIG. 8 a transport carrier for the suspended transport of an article as it can be used on an overhead conveying device.

FIG. 8 shows an example of a transport carrier 52 for an overhead conveying device, from which an article 11 schematically adumbrated by dotdashed lines is suspended. In particular, the article 11 is suspended from the transport carrier 52 by means of a hanger.

Generally, the overhead conveying device 50 may also comprise at least one hanging bag 51 for receiving one or multiple articles 11 and at least one transport carrier 52 for hanging one or multiple articles 11 although this is not shown.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

Finally, as a matter of form, it should be noted that for ease of understanding of the structure, elements are partially not depicted to scale and/or are enlarged and/or are reduced in size.

LIST OF REFERENCE NUMBERS

10 Sorting device
11 Article(s)
12 controller
13 First switching element of the first stopper
14 Second switching element of the second stopper
15 Third switching element of the third stopper
16 Fourth switching element of the fourth stopper
20 Supply path
21 First transport path
22 Second transport path
23 Third transport path
24 Fourth transport path
31 First stopper
32 Second stopper
33 Third stopper
34 Fourth stopper
41 First apparatus for separating and identifying
42 Second apparatus for separating and identifying
43 Third apparatus for separating and identifying
44 Fourth apparatus for separating and identifying
45 Fifth apparatus for separating and identifying
46 Sixth apparatus for separating and identifying
47 Seventh apparatus for separating and identifying
48 Eighth apparatus for separating and identifying
49 Identifying means
50 Overhead conveying device
51 Hanging bag
52 Transport carrier
100 First sorting stage
101*a*, 101*b*, 101*c*, 101*d* First sorting lines
103*a*, 103*b*, 103*c*, 103*d* First entrances
105*a*, 105*b*, 105*c*, 107*d* First exits
200 Second sorting stage
201*a*, 201*b*, 201*c*, 201*d* Second sorting lines
203*a*, 203*b*, 203*c*, 203*d* Second entrances
205*a*, 205*b*, 205*c*, 205*d* Second exits
300 Third sorting stage
301*a*, 301*b*, 301*c*, 301*d* Third sorting lines
303*a*, 303*b*, 303*c*, 303*d* Third entrances
305*a*, 305*b*, 305*c*, 305*d* Third exits
400 Fourth sorting stage
401*a*, 401*b*, 401*c*, 401*d* fourth sorting lines
403*a*, 403*b*, 403*c*, 403*d* fourth entrances
405*a*, 405*b*, 405*c*, 405*d* Fourth exits

The invention claimed is:

1. A sorting device for sorting multiple articles, the device comprising:

a controller;

at least one first sorting stage with at least two first sorting lines, each having a first entrance upstream and a first exit downstream, wherein the first entrances of the first sorting lines of the first sorting stage are connected to a supply path for supplying the articles, and the first exits of the first sorting lines of the first sorting stage are connected to a first transport path for advancing the articles, and a first stopper is arranged at each of the first exits of the first sorting lines of the first sorting stage, wherein the first stopper comprises a first switching element, wherein the first switching element cooperates with the controller and is actuated by the controller in such a manner to discharge a group of articles from the respective first sorting line onto the first transport path, and a first apparatus for separating and identifying is arranged in the supply path upstream of the first sorting lines, and in each case, a second apparatus for separating and identifying is arranged in the first sorting lines of the first sorting stage and upstream of the corresponding first stopper; and at least one second sorting stage with at least two second sorting lines, each having a second entrance upstream and a second exit downstream, wherein the first exits of the first sorting lines of the first sorting stage are connected to the second entrances of the second sorting lines of the second sorting stage by means of the first transport path, so that articles can be transferred from one of the first sorting lines of the first sorting stage into one of the second sorting lines of the second sorting stage, and the second exits of the second sorting lines of the second sorting stage are connected to a second transport path for advancing the articles, and a second stopper is arranged at each of the second exits of the second sorting lines of the second sorting stage, wherein the second stopper comprises a second switching element, wherein the second switching element cooperates with the controller and is actuated by the controller in such a manner to discharge a group of articles from the respective second sorting line onto the second transport path, and a third apparatus for separating and identifying is arranged in the first transport path, and in each case, a fourth apparatus for separating and identifying is arranged in the second sorting lines of the second sorting stage and upstream of the corresponding second stopper;

wherein the first, second, third, and fourth apparatuses for separating and identifying are connected to the controller.

2. The sorting device according to claim 1, further comprising a third sorting stage arranged downstream of the second sorting stage and comprising at least two third sorting lines, each having a third entrance and a third exit, wherein the third entrances of the third sorting lines of the third sorting stage are connected to the second transport path, and the third exits of the third sorting lines of the third sorting stage are connected to a third transport path for advancing the articles, and a third stopper is arranged at each of the third exits of the third sorting lines, wherein the third stopper comprises a third switching element, wherein the third switching element cooperates with the controller and is actuated by the controller in such a manner to discharge a group of articles from the respective third sorting line onto the third transport path, and a fifth apparatus for separating and identifying is arranged in the second transport path, and in each case, a sixth apparatus for separating and identifying is arranged in the third sorting lines of the third sorting stage and upstream of the corresponding third stopper;

wherein the fifth and sixth apparatuses for separating and identifying are connected to the controller.

3. The sorting device according to claim 2, further comprising a fourth sorting stage arranged downstream of the third sorting stage and comprising at least two fourth sorting lines, each having a fourth entrance and a fourth exit, wherein the fourth entrances of the fourth sorting lines of the fourth sorting stage are connected to the third transport path, and the fourth exits of the fourth sorting lines of the fourth sorting stage are connected to a fourth transport path for advancing the articles, and a fourth stopper is arranged at each of the fourth exits of the fourth sorting lines, wherein the fourth stopper comprises a fourth switching element, wherein the fourth switching element cooperates with the controller and is actuated by the controller in such a manner to discharge a group of articles from the respective fourth sorting line onto the fourth transport path, and a seventh apparatus for separating and identifying is arranged in the third transport path, and in each case, an eighth apparatus for separating and identifying is arranged in the fourth sorting lines of the fourth sorting stage and upstream of the corresponding fourth stopper;

wherein the seventh and eighth apparatuses for separating and identifying are connected to the controller.

4. The sorting device according to claim 3, wherein at least one of the first, second, third, and fourth sorting stages has comprises more than two sorting lines.

5. The sorting device according to claim 3, wherein the controller is configured and provided for counting the articles by at least one of the first, second, third, fourth, fifth, sixth, seventh, and eighth apparatuses for separating and identifying.

6. The sorting device according to claim 3, wherein at least one of the first, second, third, fourth, fifth, sixth, seventh, and eighth apparatuses for separating and identifying comprises at least one reader and the articles (11) each are assigned an identifying means readable by the at least one reader.

7. The sorting device according to claim 3, wherein the supply path, the first, second, third, and fourth sorting lines and the first, second, third, and fourth transport paths comprise an overhead conveying device for the suspended transport of the articles.

8. The sorting device according to claim 7, wherein the overhead conveying device comprises at least one hanging bag for receiving one or multiple articles.

9. The sorting device according to claim 7, wherein the overhead conveying device comprises transport carriers for suspending at least one article.

10. A sorting method for articles, comprising the steps of:

(S1) supplying articles on a supply path, (S2) a first identification and separation of the articles in the supply path, (S3) a first distribution of the articles based on the first identification and separation (S2), on at least two first sorting lines, (S4) a second identification and separation of the articles in the respective first sorting line, (S5) a first collecting of articles to form a first group of articles in the respective first sorting line, (S6) a first discharge of the first group of articles as a first sorting run from the first collecting of articles (S5) into a first transport path, (S7) a third identification and separation of the articles from the first group of articles in the first transport path, (S8) a second distribution of the articles from the first group of articles based on the third identification and separation (S7), on at least two second sorting lines, (S9) a fourth identification and separation of the articles in the respective second sorting line, (S10) a second collecting of articles to form a second group of articles in the respective second sorting line, and (S11) a second discharge of the second group of articles as a second sorting run from the second collecting of articles (S10) into a second transport path.

11. The sorting method according to claim 10, further comprising the steps of:

(S12) a fifth identification and separation of the articles in the second transport path, (S13) a third distribution of the articles from the second group of articles based on the fifth identification and separation (S12), on at least two third sorting lines, (S14) a sixth identification and separation of the articles in the respective third sorting line, (S15) a third collecting of articles to form a third group of articles in the respective third sorting line, and (S16) a third discharge of the third group of articles as a third sorting run from the third collecting of articles (S15) into a third transport path.

12. The sorting method according to claim 11, further comprising the steps of:

(S17) a seventh identification and separation of the articles in the third transport path, (S18) a fourth distribution of the articles from the fourth group of articles based on the seventh identification and separation (S17), on at least two fourth sorting lines, (S19) an eighth identification and separation of the articles in the respective fourth sorting line, (S20) a fourth collecting of articles to form a fourth group of articles in the respective fourth sorting line, and (S21) a fourth discharge of the fourth group of articles as a fourth sorting run from the fourth collecting of articles (S20) into a fourth transport path.

* * * * *